June 21, 1927.　　　　G. LOLLI　　　　1,632,979
EXTENSIBLE FENDER
Filed Oct. 18, 1926　　　2 Sheets-Sheet 1
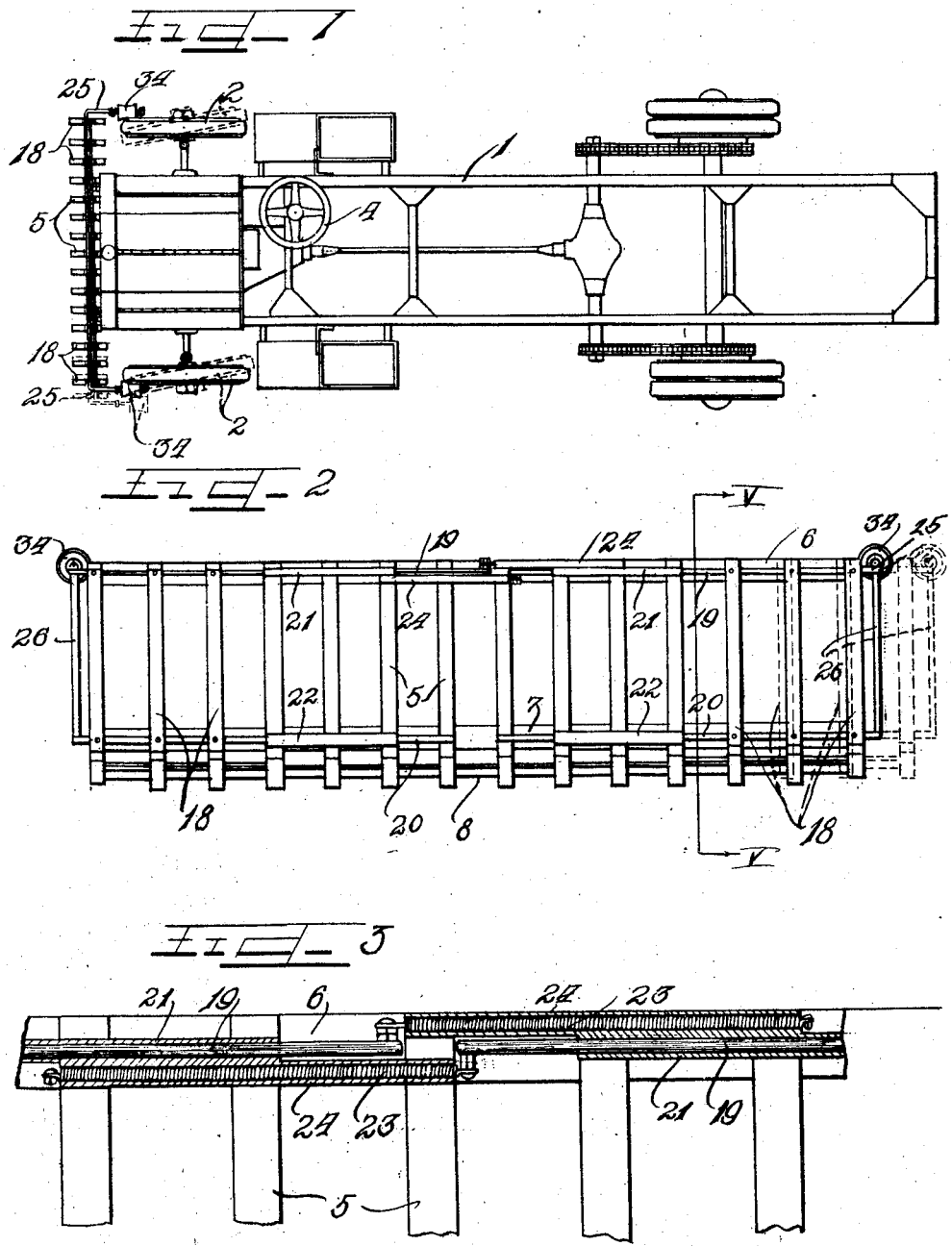
INVENTOR
Guido Lolli June 21, 1927.  
G. LOLLI  
1,632,979  
EXTENSIBLE FENDER  
Filed Oct. 18, 1926  
2 Sheets-Sheet 2
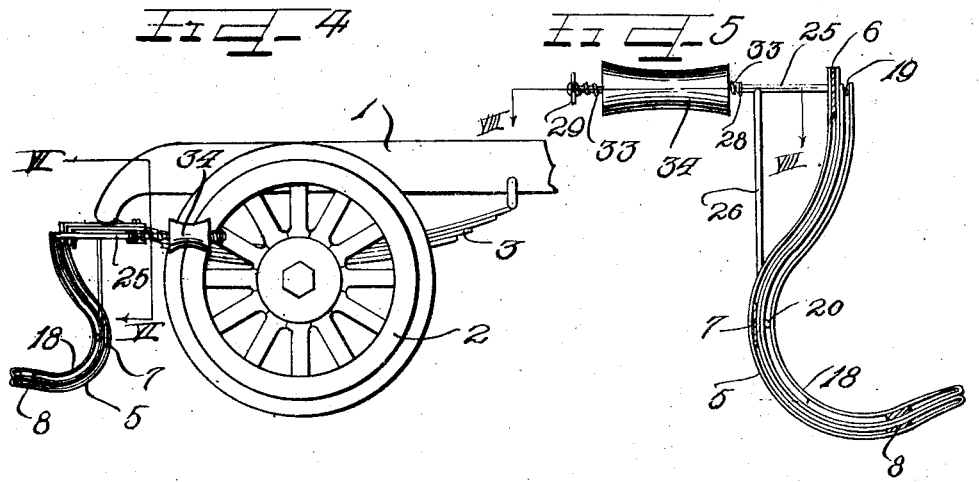
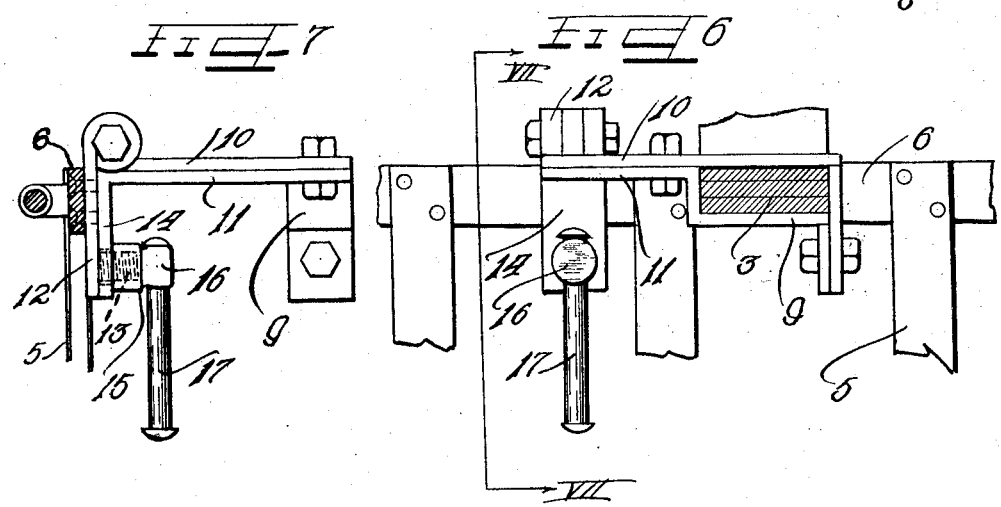
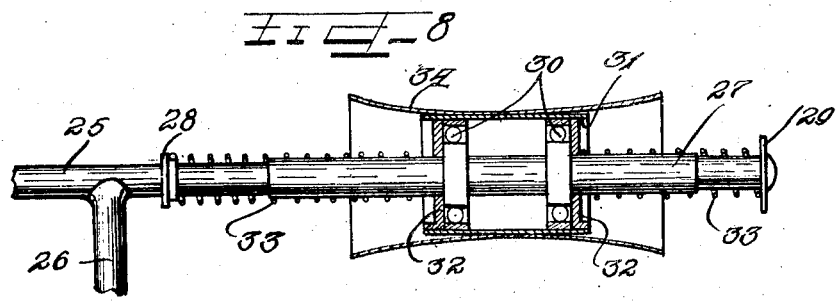
INVENTOR  
Guido Lolli  
BY Charles... ATTYS Patented June 21, 1927.

1,632,979

UNITED STATES PATENT OFFICE.

GUIDO LOLLI, OF CHICAGO, ILLINOIS.

EXTENSIBLE FENDER.

Application filed October 18, 1926. Serial No. 142,330.

This invention relates to a vehicle fender, and more particularly to a fender adapted for use on motor trucks and the like, with said fender having extensible end members adapted to be operated automatically by the steering wheels of the vehicle so that the fender is extended in the direction in which the steering wheels are turned.

It is an object of this invention to provide an extensible fender for motor vehicles and the like.

It is also an object of this invention to provide a vehicle with a fender having spring controlled extensions adapted to be automatically operated by the steering wheels of the vehicle.

It is a further object of this invention to provide a vehicle with a fender having extensions normally overlapping the fender, said extensions having bearing members thereon coacting with the steering wheels of the vehicle to permit one of the extensions to be projected by one of the steering wheels depending upon the direction that the steering wheels are turned.

It is an important object of this invention to provide a vehicle with an improved fender having spring controlled extensions thereon carrying spring controlled shiftable rollers adapted to coact with the steering wheels of the vehicle to permit either one of the extensions to be automatically projected in front of a steering wheel depending upon the direction in which the steering wheels are turned so that the fender will be extended an amount proportional to the turning of the steering wheels and in the direction in which the vehicle is to turn.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a motor vehicle chassis equipped with an improved extensible fender embodying the principles of this invention.

Figure 2 is an enlarged front elevation of the extensible fender removed from the vehicle.

Figure 3 is an enlarged section through the guide members connected with the extensible sides of the fender.

Figure 4 is a fragmentary side elevation of the front end of the vehicle showing an end elevation of the fender in position.

Figure 5 is an enlarged transverse sectional view of the fender taken on line V—V of Figure 2.

Figure 6 is an enlarged fragmentary detail view taken on line VI—VI of Figure 4 showing one of the fender supporting brackets secured in position on a vehicle spring.

Figure 7 is a detail side elevation of a clamping bracket taken on line VII—VII of Figure 6.

Figure 8 is an enlarged longitudinal section of one of the guide roller mechanisms taken on line VIII—VIII of Figure 5 with parts shown in elevation.

As shown on the drawings:

The reference numeral 1 indicates an automobile truck chassis having front steering wheels 2 and front springs 3. The front steering wheels are adapted to be operated or steered by means of the steering wheel 4 in the customary manner.

Supported upon the front springs 3 or upon any other suitable portion of the chassis across the front of the vehicle is an improved extensible fender embodying the principles of this invention. The improved fender comprises a main body portion or section embracing a plurality of curved tines or arms 5 spaced equidistantly apart in parallel relation and rigidly held in such spaced relation by means of longitudinally positioned connecting bars 6, 7 and 8. Rigidly bolted to each of the front ends of the front vehicle springs 3 is a clamping bracket 9 provided with an upper extension arm 10. Pivotally supported on the upper extension arm 10 is a hinged member 12. The upper connecting bar 6 of the main fender section is rigidly secured by means of screws, bolts or other suitable means to the hinge members 12 carried by the clamping brackets 9.

Secured to the hinge members 12 are rearwardly projecting screw studs 13 (Figure 7). The screw studs project through apertures provided in downwardly projecting arms 14 integrally formed on the lower extension brackets 11 of the clamps 9. Engaged on the projecting ends of each of the screw studs 13 is an internally threaded lock nut 15 provided with an integrally passaged head 16 through which a handle bar 17 slidably projects to permit the lock nuts 15 to be threaded upon the screw studs 13 to hold the hinged members 12 rigidly secured in position against the bracket extension arms 14. The clamping brackets 9 serve to hold the main body section of the fender in position transversely across the front end of the vehicle with the lower outwardly directed curved ends of the fender arms 5 being positioned a slight distance above the level of the ground.

Slidably mounted upon each end of the main body section of the fender is an auxiliary fender or an extension comprising a plurality of equidistantly spaced tines or arms 18 which are curved complemental to the shapes of the fender arms 5 to seat in front of the same, as clearly illustrated in Figure 5. The auxiliary fender arms 18 are connected by transversely disposed upper and lower connecting bars or rods 19 and 20, respectively, and extend inwardly across the main fender section with the upper connecting rod sliding through a guide sleeve 21, and the lower connecting rod slidably projecting through a guide sleeve 22. The guide sleeves 21 and 22 are rigidly secured longitudinally of the main fender section. Connected to the inner end of each of the guide rods 19 is one end of a coiled control spring 23 (Figure 3), which is positioned within a tube or sleeve 24 rigidly secured longitudinally across the upper portion of the main fender section. The other end of each of the control springs 23 is secured to the outer end of its respective sleeve 24.

The outer end of each rod 19 extends beyond the outermost auxiliary fender arm 18 and is bent at right angles to afford a rearwardly directed arm 25. Connected to the arm 25 is a brace rod 26 the lower end of which is integrally connected with the outer projecting end of the respective guide rod 20. The arm 25 projects into a position adjacent the outer side of its respective steering wheel 2 and has slidably mounted thereon a sleeve 27 positioned between a stop collar 28 and a stop disk 29 (Figure 8). Supported on the shiftable sleeve 27 are two ball bearings 30 connected by a cylindrical sleeve 31 having end plates 32 therein against which coiled springs 33 engage. One end of one of the springs 33 is connected to the stop disk 29 while the second end of the other control spring 33 is secured to the stop collar 28. Mounted on the sleeve 31 and rotatable therewith is a concave roller 34 adapted to be covered with rubber or any other suitable material to afford a good rolling contact with the side of the steering wheel 2 with which it contacts.

It will thus be noted that by referring to Figure 1 that the main fender section has been provided with two slidable auxiliary fender sections each of which carries a shiftable rotatable roller 34. The rollers 34 have rolling contact with the respective steering wheels 2 of the vehicle.

The operation of the device appears to be self evident from the drawings and the description thereof. It will be noted that when the improved extensible fender is mounted in position on the front ends of the vehicle springs 3 by means of the clamping brackets 9 that the control springs 33 act to normally hold the auxiliary fender sections in their innermost position positioned over the end portions of the main fender section. This is, of course, only true when the steering wheels are in their normal straight position parallel to the sides of the chassis frame, as illustrated in Figure 1. The main body section of the fender normally is sufficient to extend slightly beyond the planes of rotation of the steering wheels 2 when the wheels are parallel to the chassis sills. In case it is desired to make a curve to the right around a corner, or at any other place, it will be noted that the steering wheel 4 when rotated to turn the steering wheels 2 towards the right will cause the right hand steering wheel (looking toward the front of the car) to act on its respective guide roller 34 to cause the respective arm 25 to move outwardly thereby causing the respective right hand auxiliary fender section to slide outwardly against the action of its control springs 23. Since the left hand steering wheel moves away from its rollers the left hand auxiliary fender section remains in its normal place. In case the wheels are turned for the purpose of making a left hand turn the left hand steering wheel 2 will act on its roller 34 to cause the left hand auxiliary fender section to slide outwardly a distance proportional to the degree that the steering wheels are turned. It will thus be noted that when the steering wheels are turned either to the right or left that the slidable auxiliary fender sections will always be positioned in front of the respective steering wheels so that there is no danger of a person or object caught in the fenders to travel under the advancing wheels. When the steering wheels 2 are turned back into their normal position the control springs 33 act to automatically pull the extended fender sections back into their normal position with the rods 19 and 20 sliding in the respective guide sleeves 21 and 22.

The extensible fender while shown associated with the front steering wheels of the motor truck or automobile chassis may, of course, be used in any similar position on different types of vehicles or the like where it may be desirable to have an extensible fender of the type herein described.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a vehicle and the steering wheels thereof, of an extensible fender mounted at the front end of a vehicle, and means connected with said fender co-acting with the steering wheels to be actuated thereby to cause the fender to be extended when the steering wheels are turned.

2. The combination with a vehicle and the steering wheels thereof, of an extensible fender supported on the vehicle, and roller means carried by the fender and co-acting with the steering wheels to permit the fender to be extended either to the right or left depending upon whether the steering wheels are turned right or left.

3. The combination with a vehicle and the steering wheels thereof, of a main fender section supported on the front end of the vehicle, auxiliary fender sections slidably mounted on said main fender section, and roller mechanisms carried by said auxiliary fender sections and positioned to coact with the steering wheels to cause one of the auxiliary fender sections to be extended when the steering wheels are turned.

4. The combination with a vehicle and the steering wheels thereof, of a main fender supported on the vehicle, auxiliary fenders slidably mounted thereon, bracket arms carried by said auxiliary fender sections, spring controlled rotatable rollers shiftably mounted on said bracket arms and having rolling engagement with the steering wheels of the vehicle to cause one of the auxiliary fender sections to be slidably projected to the right when the steering wheels are turned toward the right and the other auxiliary fender section to be projected to the left when the steering wheels are turned towards the left.

5. A vehicle fender comprising a main fender section, auxiliary fender sections slidably mounted thereon, springs for normally holding the auxiliary fender sections in a normal position over said main fender section, bracket arms formed on the auxiliary fender sections, and rotatable rollers shiftably mounted on said bracket arms.

6. A vehicle comprising a main fender section, auxiliary fender sections slidably mounted thereon, guides for said auxiliary fender sections, springs for resiliently holding the auxiliary fender sections in their retracted positions, brackets formed on said auxiliary fender sections, sleeves shiftably mounted on said brackets, rollers rotatably mounted on said sleeves, and springs co-acting with the rollers to shiftably hold the same in operative position.

7. A vehicle fender comprising a main fender section, auxiliary fender sections slidably mounted thereon, and means for extending the auxiliary fender sections independently of one another.

8. A vehicle fender comprising a main fender section, auxiliary fender sections slidably mounted thereon, mechanisms carried by said auxiliary fender sections adapted to permit the auxiliary fender sections to be slidably projected independently of one another beyond the ends of the main fender section, and means for automatically returning the auxiliary fender sections to normal position.

9. A vehicle fender comprising a plurality of slidable fender sections, means for extending said fender sections with respect to one another in one direction at a time to cause lengthening of the fender at one end, and means for returning the extended fender section back into normal position.

10. A vehicle fender comprising a main fender section, clamping means for supporting the same in position upon a vehicle, auxiliary fender sections slidable on said main fender section, guides for said auxiliary fender sections, brackets carried by said auxiliary fender sections, spring controlled rollers shiftably mounted on said brackets, and resilient means for automatically returning the auxiliary fender sections back into normal position when released.

11. The combination with a vehicle, of an extensible fender mounted thereon, and means operated by the vehicle for lengthening the fender in one direction at a time a distance proportional to the degree of turning of the vehicle.

12. The combination with a vehicle, of an extensible fender mounted thereon, and means operable by the vehicle for lengthening the fender longitudinally in opposite directions independently of one another a distance automatically controlled by said vehicle.

13. The combination with a vehicle and the steering mechanism thereof, of an extensible fender mounted on the vehicle and extendable in one direction at a time by said steering mechanism.

14. The combination with a vehicle, of an extensible fender mounted at one end thereof, and automatically extendable by the steering mechanisms of the vehicle.

15. A vehicle fender comprising a main fender section, and auxiliary fender sections slidably mounted thereon adapted to permit the length of the fender to be increased automatically in one direction at a time corresponding with the direction of steering of the vehicle.

16. The combination with a vehicle, of an extensible fender mounted thereon, and means operable by the steering mechanism of the vehicle to cause the length of the fender to be increased in the direction of turning of the vehicle.

In testimony whereof I have hereunto subscribed my name.

GUIDO LOLLI.